(12) United States Patent
Noda et al.

(10) Patent No.: US 7,643,728 B2
(45) Date of Patent: Jan. 5, 2010

(54) MAGNETIC RECORDING/REPRODUCTION APPARATUS

(75) Inventors: Akiyuki Noda, Osaka (JP); Shinji Takemoto, Osaka (JP); Hiroyuki Yamashita, Osaka (JP); Tsuneki Fujimoto, Nara (JP)

(73) Assignee: Panasonic Corporation, Osaka (JP)

( * ) Notice: Subject to any disclaimer, the term of this patent is extended or adjusted under 35 U.S.C. 154(b) by 724 days.

(21) Appl. No.: 10/525,844

(22) PCT Filed: Jan. 29, 2004

(86) PCT No.: PCT/JP2004/000808

§ 371 (c)(1),
(2), (4) Date: Feb. 25, 2005

(87) PCT Pub. No.: WO2004/068488

PCT Pub. Date: Aug. 12, 2004

(65) Prior Publication Data

US 2006/0165378 A1  Jul. 27, 2006

(30) Foreign Application Priority Data

Jan. 30, 2003  (JP) ............................. 2003-021854

(51) Int. Cl.
H04N 5/91 (2006.01)
H04N 5/93 (2006.01)
H04N 7/00 (2006.01)
H04N 7/64 (2006.01)
H04N 9/79 (2006.01)
H04N 9/475 (2006.01)
H04B 1/20 (2006.01)
H04H 60/27 (2008.01)
G11B 5/00 (2006.01)
G11B 7/28 (2006.01)
G11B 7/085 (2006.01)
G11B 19/02 (2006.01)

(52) U.S. Cl. .............................. 386/95; 386/35; 386/46; 386/52; 386/65; 386/100; 386/104; 386/113; 386/123; 348/512; 360/7; 360/32; 360/72.2; 369/6; 369/7; 369/30.04; 369/84

(58) Field of Classification Search .................. 386/95, 386/35, 46, 52, 65, 113, 123, E9.01, E9.012, 386/E9.019, E9.052, 100, 104; 360/7, 32, 360/72.2; 369/6, 7, 30.04, 84; 348/512, 348/E5.122

See application file for complete search history.

(56) References Cited

U.S. PATENT DOCUMENTS 4,618,890 A * 10/1986 Kouyama et al. ........... 348/512

(Continued)

FOREIGN PATENT DOCUMENTS

JP  04252484 A * 9/1992

(Continued)

OTHER PUBLICATIONS

Chinese Office Action issued in Chinese Patent Application No. CN 200480002844.4, mailed Apr. 11, 2008.

Primary Examiner—Thai Tran
Assistant Examiner—Syed Y Hasan
(74) Attorney, Agent, or Firm—McDermott Will & Emery LLP (57) ABSTRACT

A video signal recording apparatus with a video and audio memorizing section for temporarily memorizing an inputted video audio signal, a time code generating section for generating a time-code of said video audio signal an auxiliary information memorizing section for temporarily memorizing auxiliary information appended to said video audio signal including said time code generating a regeneration value obtained from a time code to which one frame time is added to said recorded time code when a recording starts and correcting said regeneration value for an amount of delay corresponding to a storage volume temporarily memorized in said auxiliary information (time code, metadata, CUE audio signal, and the like) memorizing section and thus obtaining a corrected time code, and thereafter sequential time codes are generated from said corrected time code though said time code generating section.

1 Claim, 6 Drawing Sheets

U.S. PATENT DOCUMENTS

| | | | |
|---|---|---|---|
| 4,633,331 A * | 12/1986 | McGrady et al. | 360/7 |
| 4,901,119 A * | 2/1990 | Yoshimura et al. | 386/113 |
| 5,345,430 A * | 9/1994 | Moe | 369/7 |
| 5,758,013 A * | 5/1998 | Kizu et al. | 386/123 |
| 6,064,792 A * | 5/2000 | Fox et al. | 386/46 |
| 6,115,202 A * | 9/2000 | Yoshida et al. | 360/72.2 |
| 6,141,484 A * | 10/2000 | Nagasawa et al. | 386/52 |

FOREIGN PATENT DOCUMENTS

| | | |
|---|---|---|
| JP | 9-130718 | 5/1997 |
| JP | 10-11705 | 1/1998 |
| JP | 10-56634 | 2/1998 |
| JP | 10-322659 | 12/1998 |
| JP | 11205725 A * | 7/1999 |

* cited by examiner

MAGNETIC RECORDING/REPRODUCTION APPARATUS

FIELD OF THE INVENTION

The present invention relates to a magnetic recording/reproduction apparatus, more particularly to a magnetic recording/reproduction apparatus used for news coverage, a crime prevention system, animation photographing, and the like, and capable of an intermittent video photographing.

BACKGROUND OF THE PRESENT INVENTION

A camera-incorporated videotape recorder, which is an apparatus for recording a video signal, is used for news coverage and the like because of its portability. In using the video signal recording apparatus of such a type, a recording time is restricted in response to a capacity of a videotape as a recording medium. Therefore, a photographer generally leaves the recording apparatus in a recording standby state until a scene which he/she wishes to record arrives, and switchovers the apparatus to a recording state when the scene which he/she wishes to record arrives to thereby record the desired scene. In the video signal recording apparatus, still pictures serially photographed per a predetermined interval (for example, 1/30 second) are serially recorded on the videotape so that the recording of moving pictures is realized.

Auxiliary information such as a time code and metadata is recorded on the recording medium apart from a video audio signal comprised of an inputted video signal and audio signal of a plurality of channels. The auxiliary information is utilized in a later editing work as information for managing photographed videos and an audio material.

In contrast, it is desired that, in the video signal recording apparatus used for the crime prevention system, animation photographing and the like, the video audio signal is generated through a photographing operation, which is intermittently implemented per an interval longer than the predetermined interval (1/30 second) mentioned earlier, and the video audio signal is serially recorded on the videotape in a high-density and high-definition manner.

In the video signal recording apparatus such as the camera-incorporated videotape recorder, in general, there is a time lag from a time point when a recording-start operation is carried out until the recording apparatus is stabled and ready to actually perform the recording with respect to the tape. During the time period, the video audio signal cannot be recorded. Therefore, when the video signal recording apparatus is used in the news coverage and the like, there is a risk that the recording may be performed failing to record a picture or audio at a moment when the photographer wishes to record, in which some scenes to be captured are missing.

Further, the intermittent video photographing for the news coverage, animation photographing, and the like, the photographing is performed by sequentially repeating (photographing, recording)→(photographing, recording halt)→(photographing, recording restart). However, because of the presence of the time lag, the intermittent video photographing provided with relatively large photographing intervals of a few seconds to a few minutes can be performed, while failing to realize the intermittent video photographing provided with relatively small intervals shorter than the time lag, for example, one second or less. Further, a start-up (time required for starting photographing) is different from one recording apparatus to another (time-length error), which depends on an accuracy of each apparatus, and the time lag is variable in the respective apparatuses. Because of the mentioned problems, it is not easy to assure an accuracy in setting the photographing intervals of the intermittent video photographing (in particular, accuracy in setting minimum photographing intervals).

Therefore, an effort to solve the foregoing problems has been conventionally made by means of a technology recited in No. 10-322659 of the Publication of the Unexamined Patent Applications. To specifically describe the technology, a data retaining device comprised of a memory and a memory control circuit is provided between a video signal compressing device for compressing an inputted video signal and thereby outputting the compressed video signal and a recording device for recording the compressed video signal on a recording medium. The video audio signals, which are equivalent to a plurality of frames and a time length equal to or exceeding an amount of time required from the time point when the recording-start operation is carried out until the actual recording with respect to the videotape, are constantly written in the memory, the write and read of the video audio signals with respect to the memory are controlled by the memory control circuit.

According to the foregoing configuration, the video audio signals from the time point when the recording-start operation is carried out or a time point prior thereto until the time point when the actual recording is enabled are temporarily recorded in the memory. Thereby, a content temporarily recorded in the memory can be written in the videotape when the recording apparatus is up for the recording, and the recording can be thus performed without any signal missed out, starting from the video audio signal positioned at the time point of the recording-start operation. Further, according to the foregoing configuration, the video audio signal photographed per an interval shorter than the time lag can be written in the videotape. Then, the video audio signals intermittently photographed with intervals between 1/30 second and approximately one second can be serially recorded.

However, in the described conventional video signal recording apparatus, compression information of the video audio signal outputted from the compressing device is written and read with respect to the memory, while the auxiliary information such as the time code and metadata pertaining to the photographed video audio signal is recorded on the recording medium from a generation source of the auxiliary information by means of the recording device without an intervention of the memory. Because of that, the auxiliary information is unavoidably temporally delayed relative to the video audio signal on the recording medium. Therefore, a relationship between the video audio signal recorded on the recording medium and the auxiliary information is lost, which makes it difficult to effectively utilize the auxiliary information.

The metadata mentioned earlier is information in which an attribute of the video audio material is denoted in detail, an is comprised of photographing terms such as a photographing time, photographing location as a position information by means of GPS, photographer, shutter speed and iris, a type of filter, and photographic sensitivity, and color space information such as gamma, color gamut and the like, and utilized for compilation of a database, an after process, or the like.

Further, the auxiliary information, other than the mentioned, includes a CUE audio signal recorded in a linear track and used for a search operation in a fast forward/fast rewind reproduction. The video audio signal is recorded as a digital signal in a helical track of the videotape as the recording medium, while the CUE audio signal is recorded as an analogue signal in a linear CUE track thereof. Therefore, the CUE audio signal can achieve a high level of reproducibility, and therefore is used for the search operation. The CUE audio signal, as in the case of the other auxiliary information, undergoes a deteriorated accuracy in the search operation at the time of fast forward/fast rewind reproduction when there is any temporal delay relative to the video audio signal.

A main object of the present invention is to record the auxiliary information, such as the time code and metadata, and the CUE audio signal on the recording medium without any temporal delay relative to the video audio signal in the video signal recording apparatus.

DISCLOSURE OF THE INVENTION

1) In order to achieve the foregoing object, a magnetic recording/reproduction apparatus according to the present invention comprises:

a video and audio memorizing section for temporarily memorizing an inputted video audio signal;

an auxiliary information memorizing section for temporarily memorizing auxiliary information appended to the video audio signal;

a memory control device for controlling write and read operations of the video audio signal with respect to the video and audio memorizing section and controlling write and read operations of the auxiliary information with respect to the auxiliary information memorizing section; and a recording device for sequentially recording the video audio signal read from the video and audio memorizing section and the auxiliary information read from the auxiliary information memorizing section on a recording medium. The memory control device stores the video audio signals equivalent to a time length equal to or exceeding an amount of time required from a time point when a recording-start request with respect to the recording medium is made until the recording actually starts with respect to the recording medium in the video and audio memorizing section to thereby delay the video audio signals and record them on the recording medium. The memory control device further stores the auxiliary information appended to the video audio signals in the auxiliary information memorizing section for a time period equal to the delay of the video audio signals to thereby delay the auxiliary information and then record it on the recording medium.

In the foregoing case, it is preferable for the memory control device to control the write operations with respect to the video and audio memorizing section and the auxiliary information memorizing section so as to implement an intermittent video photographing per an interval shorter than the amount of time required from the time point when the recording-start request with respect to the recording medium is made until the recording actually starts with respect to the recording medium.

2) Further, a magnetic recording/reproduction apparatus according to the present invention comprises:

a video and audio memorizing section for temporarily memorizing an inputted video audio signal;

a CUE audio memorizing section for temporarily memorizing a CUE audio signal which is an audio signal of a channel optionally selected from the video audio signals or an audio signal combining the optionally selected audio signals of a plurality of channels and recorded in a linear track along a longitudinal direction of a tape;

a memory control device for controlling write and read operations of the video audio signal with respect to the video and audio memorizing section and controlling write and read operations of the CUE audio signal with respect to the CUE audio memorizing section; and a recording device for sequentially recording the video audio signal read from the video and audio memorizing section and the CUE audio signal read from the CUE audio memorizing section on a recording medium. The memory control device stores the video audio signals equivalent to a time length equal to or exceeding an amount of time required from a time point when a recording-start request with respect to the recording medium is made until the recording actually starts with respect to the recording medium in the video and audio memorizing section to thereby delay the video audio signals and record them on the recording medium. The memory control device further stores the CUE audio signal in the CUE audio memorizing section for a time period equal to the delay of the video audio signals to thereby delay the CUE audio signal and then record it on the recording medium.

In the foregoing case, it is preferable for the memory control device to control the write operations with respect to the video and audio memorizing section and the CUE audio memorizing section so as to implement an intermittent video photographing per an interval shorter than the amount of time required from the time point when the recording-start request with respect to the recording medium is made until the recording actually starts with respect to the recording medium.

In the inventions according to 1) and 2), it is preferable to reproduce a time code in the previously recoded auxiliary information and positioned immediately prior to a recording-start position on the recording medium where the recording device starts the recording next, generate a regeneration value obtained by adding a frame to the reproduced time code when the next recording starts, replace the time code in the auxiliary information outputted from the auxiliary information memorizing section with a serial value starting with the regeneration value to thereby record it as the auxiliary information. Further, it is preferable to correct the regeneration value by an amount of delay corresponding to a storage volume memorized in the auxiliary information memorizing section to thereby reflect the regeneration value on a time code generating section so that a time difference between the time code on the tape and the time code generating section can be eliminated.

PREFERRED EMBODIMENTS OF THE PRESENT INVENTION

Hereinafter, preferred embodiments of the present invention are described in detail referring to the drawings.

First Embodiment

Figure 1:
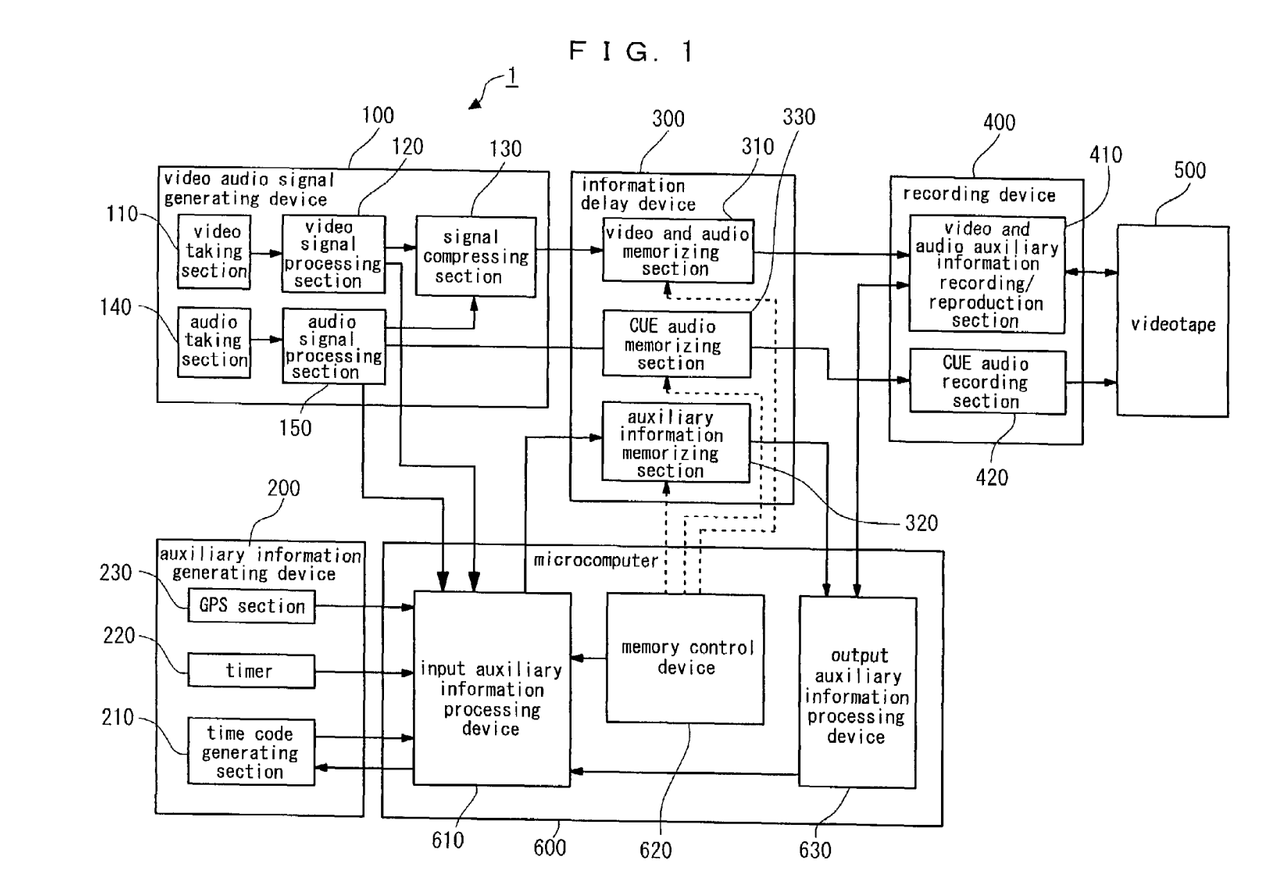
FIG. 1 is a block diagram illustrating a configuration according to a first embodiment of the present invention.

FIG. 1 is a block diagram illustrating a configuration of a magnetic recording/reproduction apparatus 1 according to a first embodiment of the present invention. The magnetic recording/reproduction apparatus 1 comprises, as shown in FIG. 1, a video audio signal generating device 100, an auxiliary information generating device 200, an information delay device 300, a recording device 400, a videotape 500, and a micro computer 600.

The video audio signal generating device 100 comprises a video taking section 110 comprised of a lens, CCD and the like, a video signal processing section 120 for applying a digital processing or the like to a video signal obtained by the video taking, a signal compressing section 130 for applying a compression encoding to the digital video signal, an audio taking section 140 comprised of a microphone, an audio signal generator and the like, and an audio signal processing section 150 for applying a digital processing or the like to an audio signal obtained by the audio taking section 140. In order to synchronize the digital audio signal with the video signal, the signal compressing section 130, other than applying the compression encoding to the digital video signal, divides the digital audio signal and the video signal per video frame (for example, 1/30 second in NTSC method) and shuffles them, and outputs the shuffling result to a video and audio memorizing section 310.

An image compression method employed for compressing the video signal in the signal compressing device 130 is, for example, DV method, which includes only I picture subjected to an intra-frame encoding. A data volume of the video signals is compressed by the compression encoding to a predetermined compression volume of approximately (1/6.7), (1/5), (1/3.3), or the like.

The digital audio signal outputted from the audio signal processing section 150 is outputted to the signal compressing section 130, and further outputted to a CUE audio memorizing section 330 as CUE audio used for a search operation in a fast forward/fast rewind reproduction of the tape and also as an audio signal of an optionally selected channel or an audio signal of a combined plurality of channels optionally selected.

The auxiliary information generating device 200 comprises a time code generating section 210 for generating a time code used for editing and as an optionally settable time information and the like, a timer 220 for generating a generation time (hereinafter, referred to as video audio signal generation time) when the video audio signal is generated in the video audio signal generating device 100, and a GPS section 230 for generating a current position information (longitude, latitude, altitude) by means of GPS (Global Positioning System), wherein each information is outputted to an input auxiliary information processing device 610. The video audio signal generation time generated by the timer 220 corresponds to absolute time information of the video audio signal.

The information delay device 300 comprises a video and audio memorizing section 310, an auxiliary information memorizing section 320, and a CUE audio memorizing section 330. The information delay device 300 has a recording region having a relatively large capacity (for example, hundreds of megabytes). To be more specific, the video and audio memorizing section 310 has a capacity capable of temporarily memorizing the video audio signals equivalent to a time length substantially equal to or exceeding a time lag generated from a time point when a recording-start instruction is issued from outside until the recording actually starts with respect to the videotape 500. In the same manner, the auxiliary information memorizing section 320 has a capacity capable of temporarily memorizing auxiliary information equivalent to the time length substantially equal to or exceeding the time lag. The CUE audio memorizing section 330 has a capacity capable of temporarily memorizing the audio signals equivalent to the time length substantially equal to or exceeding the time lag.

The memory control device 620 performs a control described below when the encoded video signal and audio signal are written and read with respect to the video and audio memorizing section 310 to thereby delay a time length required until the written information is read and output it to a video and audio auxiliary information recording/reproduction section 410.

The video audio signal generated by the video audio signal generating device 100 is constantly written in the video and audio memorizing section 310 and the CUE audio memorizing section 330, while the auxiliary information generated by the auxiliary information generating section 200 is constantly written in the auxiliary information memorizing section 320. When the video audio signal generated by the video audio signal generating device 100 is written at a memory position on the video and audio memorizing section 310 (hereinafter, referred to as address), the auxiliary information such as the time code and metadata of the vide audio signal is written at an address position on a time axis corresponding to the video audio signal in the auxiliary information memorizing section 320. The audio signal is written at an address position on a time axis corresponding to the video audio signal in the CUE audio memorizing section 330.

Further, when the stored video audio signal is read from an address position in the video and audio memorizing section 310, the auxiliary information of the video audio signal is read from the address position on the time axis corresponding to the video audio signal in the auxiliary information memorizing section 320, while the audio signal is read from the address position on the time axis corresponding to the video audio signal in the CUE audio memorizing section 330. The read vide audio signal, auxiliary information, and CUE audio signal are recorded on the videotape 500 as a recording medium by the recording device 400.

The auxiliary information memorizing section 320 is controlled by a memory control device 620 in the same manner as the video and audio memorizing section 310, wherein the auxiliary information pertaining to the video signal and audio signal stored in the video and audio memorizing section 310 is delayed based on the control of the memory control device 620. The delay-processed auxiliary information is outputted to the video and audio auxiliary information recording/reproduction section 410 via an output auxiliary information processing device 630 described later. Further, the CUE audio memorizing section 330 is controlled by the memory control device 620 in the same manner as the video and audio memorizing section 310, wherein the digital audio signal is divided and delayed per frame to synchronize with the video signal, and outputted to a CUE audio recording section 420.

The recording device 400 comprises the video and audio auxiliary information recording/reproduction section 410 and the CUE audio recording section 420. The video and audio auxiliary information recording/reproduction section 410 adds an error correction code to the video signal and audio signal outputted from the video and audio memorizing section 310, and further, the digital signal such as the auxiliary information outputted from the auxiliary information memorizing section 320, and records them in a helical track of the videotape 500. The recording device 400 reproduces the video audio signal and the auxiliary information in a pre-recording run-up state described later.

The CUE audio recording section 420 converts the digital audio outputted from the CUE audio memorizing section into an analogue signal and records it in a CUE audio track of the videotape 500.

The videotape 500 serving as the recording medium, though not shown, has a video region, an audio region, the helical track region for recording the digital signal including sub-code regions, the CUE audio track which is a linear track for recording the analogue audio. As a region capable of recording the auxiliary information can be mentioned, for example, a VAUX region for recording the auxiliary information with respect to the video signal in the video region, an AAUX region for recording the auxiliary information with respect to the audio signal in the audio region, and a sub-code region for recording any other auxiliary information. The CUE audio signal recorded in the CUE audio track mainly serves to reproduce the audio when the tape is fast forwarded/fast rewind and is used for the search operation.

The microcomputer 600 comprises the input auxiliary information processing device 610, memory control device 620, and output auxiliary information processing device 630. The input auxiliary information processing device 610 shapes the information inputted from the time code generating section 210, timer 220 and GPS section 230 and material information pertaining to the video audio signal inputted from the video signal processing section 120 and audio signal processing section 150 into a signal form suitable for recording with respect to the tape, and outputs the shaping result to the auxiliary information memorizing section 320 as the auxiliary information comprised of the time code and metadata. Further, in a tape regeneration mode described later, a regenerated time code is set in the time code generating section 210.

The microcomputer 600 controls the write/read of the video audio signal, auxiliary information, and CUE audio signal with respect to the video and audio memorizing section 310, auxiliary information memorizing section 320, and CUE audio memorizing section 330.

According to the foregoing configuration, the video audio signals, auxiliary information, and CUE audio signals, which are photographed since a photographing time traced back by the time length equal to or exceeding the time lag generated from the time point when the recording device 400 starts the recording until the recording with respect to the videotape 500 actually starts, are supplied to the recording device 400 from the address positions in the video and audio memorizing section 310, auxiliary information memorizing section 320 and CUE audio memorizing section 330, where those signals and information are stored, to thereby achieve such an effect that the video audio signals, auxiliary information, and CUE audio signals can be recorded at and after the time point traced back from the recording-start time point.

Further, the output auxiliary information processing device 630 processes the auxiliary information outputted from the auxiliary information memorizing section 320 at the time of the recording with respect to the videotape 500 as circumstances demand, and outputs the processed information to the video and audio auxiliary information recording/reproduction section 410. As an example of the information processing can be mentioned a case where a serial time code is generated from the time code of the video audio signal already recorded on the tape to thereby perform the recording in the tape regeneration mode, and the like.

The tape regeneration mode is described below. The recording device 400 temporarily halts the recording, and reads the time code included in the auxiliary information located immediately prior to a position on the videotape 500 (recording-start position) where the recording device 400 is ready to perform the recording next. The auxiliary information positioned immediately prior to the position is the auxiliary information previously recorded on the videotape 500 before the recording device 400 temporarily halts the recording.

When the next recording starts (when the recording starts after the temporarily halt), a time code obtained by adding a frame to the time code read from the previously recorded auxiliary information (hereinafter, referred to as regeneration value) is generated. Next, the time code in the auxiliary information outputted from the auxiliary information memorizing section 320 is replaced by a serial value starting with the regeneration value. The tape regeneration mode is a mode for recording the auxiliary information including the thus replaced time code. The regeneration value, in its generation process, is corrected by a delay amount corresponding to the storage volume in the auxiliary information memorizing section 320. The corrected regeneration value can be thereby temporally positioned being substantially equal to the output of the time code generating section 210. Any time difference between the time code on the videotape 500 and the time code generating section 210 is thus eliminated.

Figure 4:
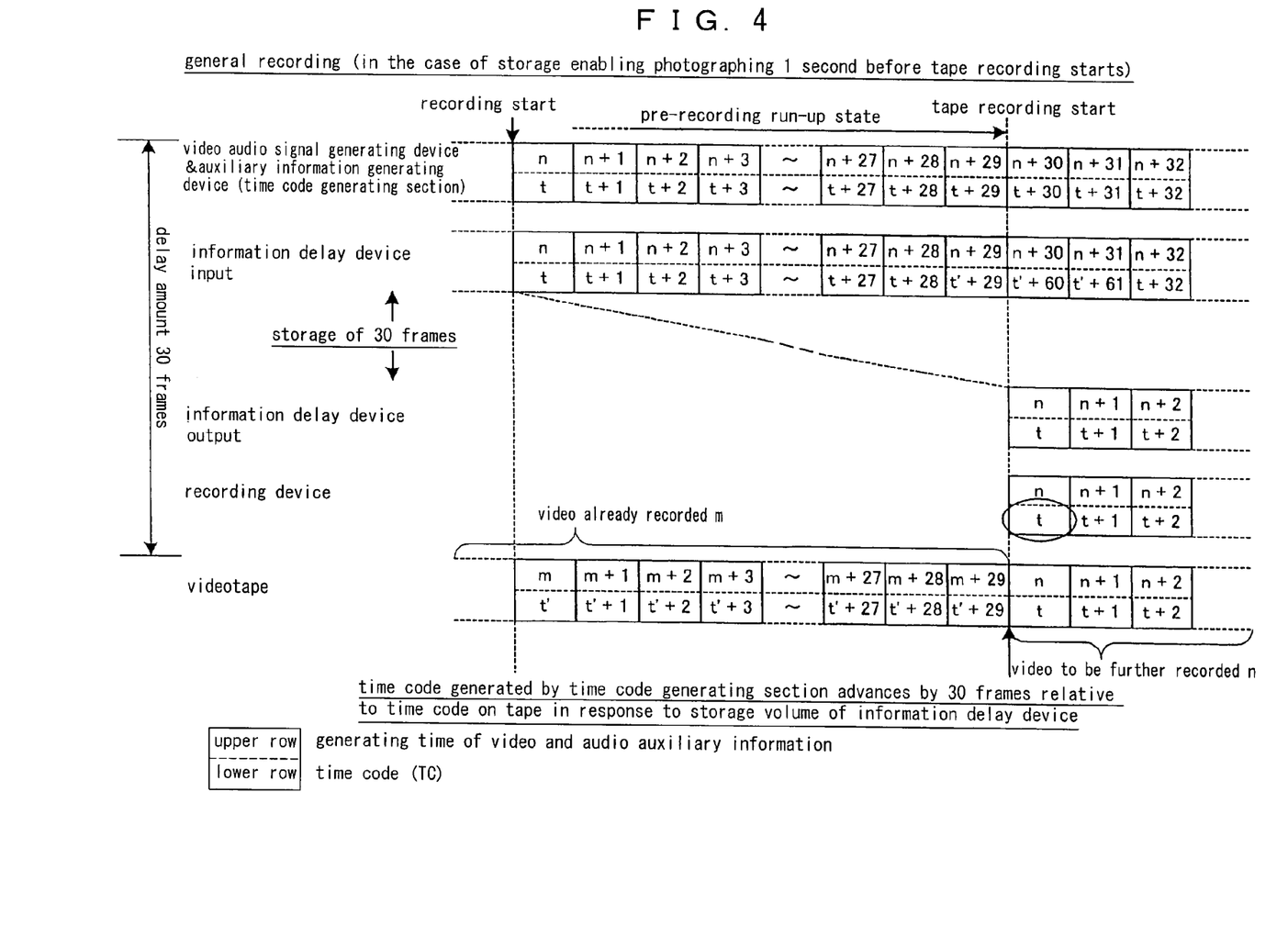
FIG. 4 is a first schematic diagram illustrating a time code relationship according to the present invention.

In an example of a general photographing in which the video audio signal and the auxiliary information are stored in the information delay device so that the photographing can start a second (30 frames in NTSC method) before the recording starts with respect to the videotape, which is shown in FIG. 4, the video and audio (n) and the time code (t) are recorded on the videotape 30 frames later after being delayed by the information delay device 300 in accordance with the storage volume. The video audio signal and the time code generated at that time (timing at which the recording is performed with respect to the videotape 500) result in n+30 and t+30, and therefore advance by 30 frames on the videotape 500. Further, in the video signal recording apparatus 1 such as a videotape recorder, when the recording starts, the tape is run in a reproduction state (hereinafter, referred to as pre-recording run-up state) until the recording actually starts in order to stable the apparatus having a recording mechanism.

Figure 5:
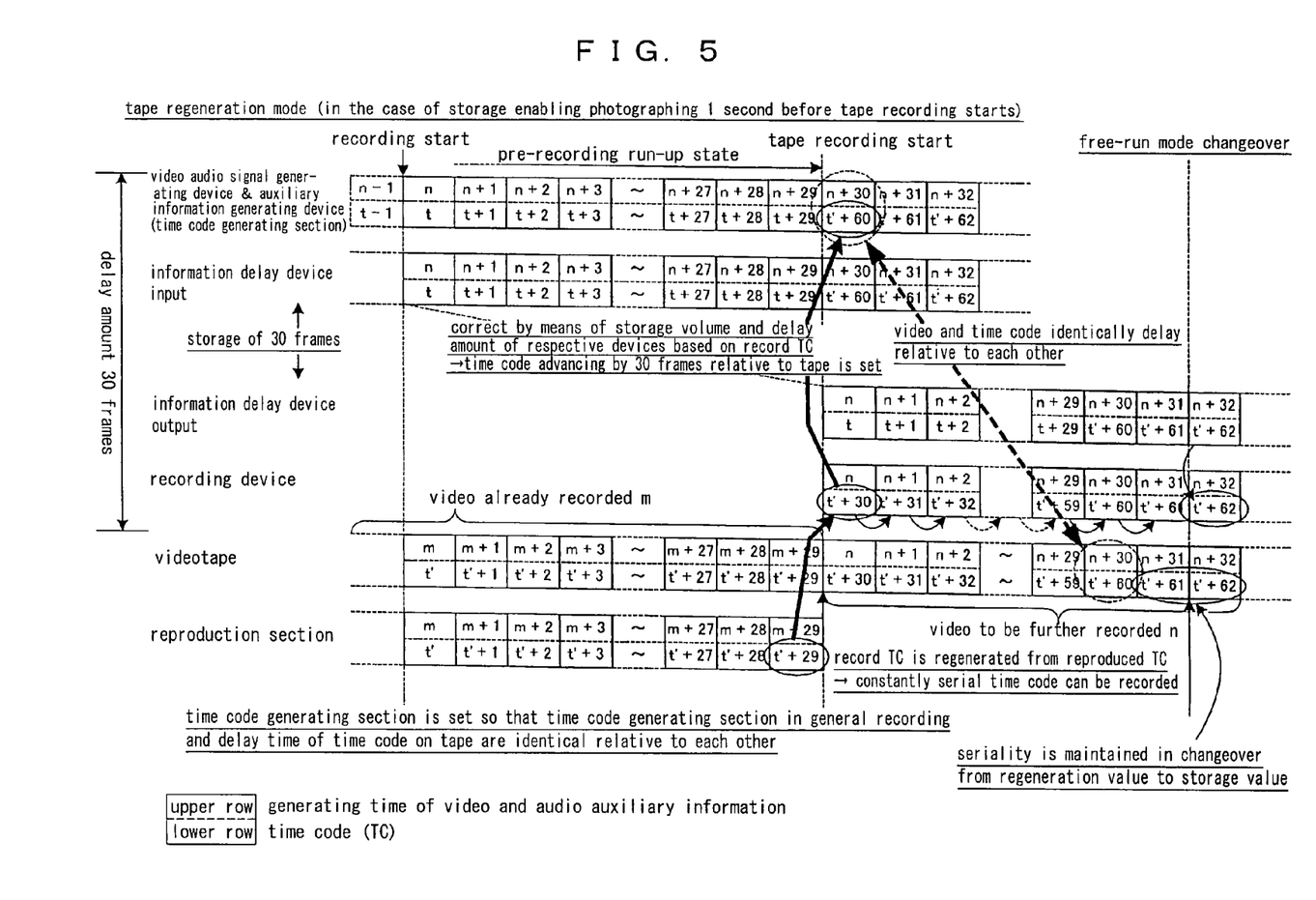
FIG. 5 is a second schematic diagram illustrating a time code relationship according to the present invention.

In FIG. 5, time codes on the videotape 500 (t'–t'+29) are reproduced in the pre-recording run-up state, and the time code (t'+29) reproduced by the video and audio auxiliary information recording/reproduction section 410 at the timing when the recording actually starts with respect to the videotape 500 is subjected to the regeneration to thereby generate and record a time code (t'+30) to be further recorded. The constantly serial time code can be thus recorded on the videotape 500.

The regenerated time code (t'+30) is delay-corrected based on the storage volume (30 frames) memorized in the auxiliary information memorizing section 320, and the delay-corrected time code (t'+60) is identical to the time code at the time of time code generation implemented by the time code generating section 210. Thereby, a delay relationship between the time code of the time code generating section 210 and the time code recorded by the video and audio auxiliary information recording/reproduction section 410 is balanced out and consumed by the delay amount in the auxiliary information memorizing section 320.

Figure 6:
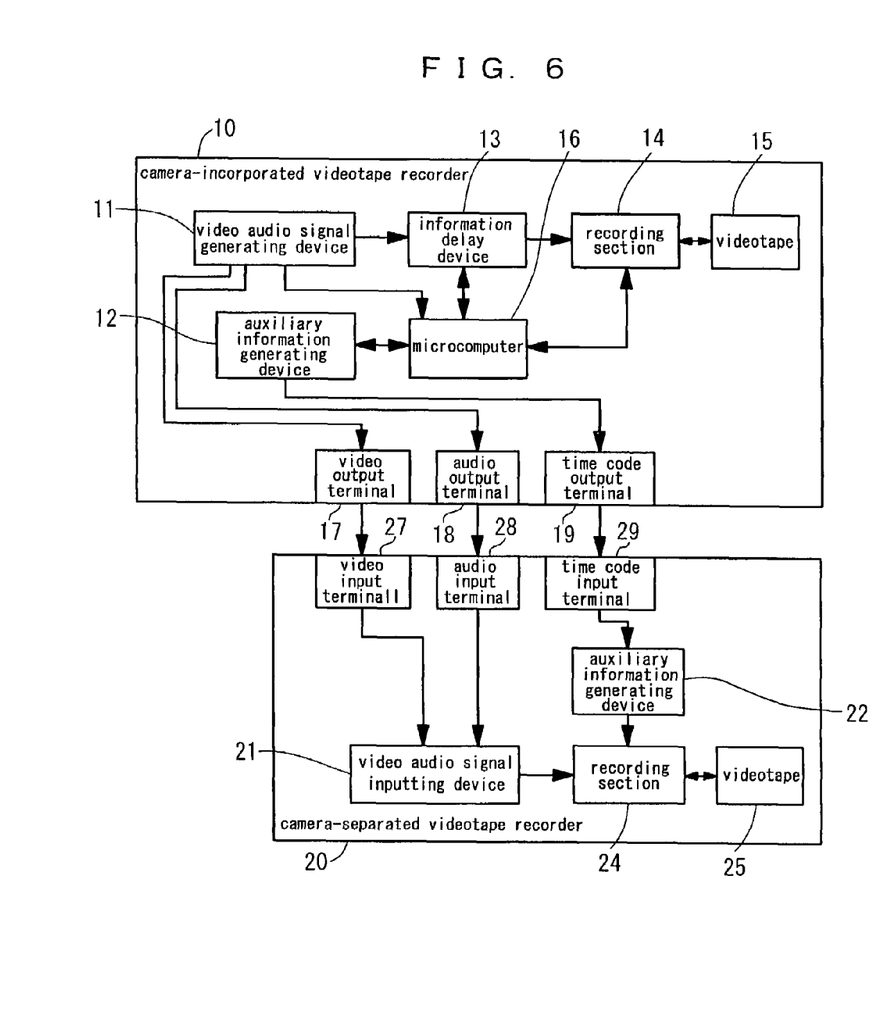
FIG. 6 is a block diagram illustrating a configuration where a video signal recording apparatus according to the present invention is connected to another video signal recording apparatus.

The balancing-out effect achieved by the delay amount according to the present invention is also effective in a coordinated recording using a camera-incorporated videotape recorder 10 and a camera-separated videotape recorder 20, which are shown in FIG. 6.

In the camera-incorporated videotape recorder 10, the video audio signal generated by a video audio signal generating device 11 and the time code generated by an auxiliary information generating device 12 are outputted to a video output terminal 17, an audio output terminal 18, and a time code output terminal 19. In the camera-separated videotape recorder 20, the time code and the vide audio signal are inputted to a video input terminal 27, an audio input terminal 28, and a time code input terminal 29 from the camera-incorporated videotape recorder 10 and recorded on a videotape 25.

In the foregoing configuration, the video audio signal and the time code recorded in the tape regeneration mode in the camera-incorporated videotape recorder 10 is recorded, remaining in the same state, on the videotape 25 in the camera-separated videotape recorder 20. Therefore, a temporal relationship between the video and the time code can be identical in the videotapes 15 and 25 where the recording is parallelly performed.

In performing the recording with respect to the tape, the tape regeneration mode may be changed to a self-run state (free-run mode conversion shown in FIG. 5) by the time code generating section 210. In such a case, the time code to be recorded is changed from the regenerated value to a value stored in the information delay device 300. The configuration according to the present invention can respond to the described situation, wherein the seriality of the time codes (t'+62–t'+63) when the change is implemented can be maintained.

It is preferable to have the following configuration when the magnetic recording/reproduction apparatus 1 according to the present embodiment is applied to a crime prevention system, animation photographing, or the like. The memory control device 620 controls a writing operation with respect to the video and audio memorizing section 310, auxiliary information memorizing section 320 and the CUE audio memorizing section 330 in such manner that an intermittent video photographing can be performed per an interval shorter than the time length required for starting the recording with respect to the videotape 500.

The video audio signal generated by the video audio signal generating device 100 is intermittently written in the video and audio memorizing section 310 in cycles defined in accordance with a photographing time length and photographing-halt intervals designated in the intermittent video photographing. The auxiliary information generated by the auxiliary information generating device 200 is also written in the auxiliary information memorizing section 320 at the same intermittent timings as in the video audio signal. Further, the CUE audio signal generated by the video audio signal generating device 100 is also written in the CUE audio memorizing section 330 at the same intermittent timings as in the video audio signal. When the information volumes stored in the video and audio memorizing section 310, auxiliary information memorizing section 320 and CUE audio memorizing section 330 are equal to or exceed the time length required for starting the recording with respect to the videotape 500, that is the before-mentioned time lag, the video audio signal, auxiliary information, and CUE audio signal are supplied to the recording device 400 from the memory positions (address position) in the video and audio memorizing section 310, auxiliary information memorizing section 320, and CUE audio memorizing section 330. The video audio signal, auxiliary information, and CUE audio memory signal intermittently photographed are thereby recorded on the videotape 500.

The information volumes to be stored in the video and audio memorizing section 310, auxiliary information memorizing section 320, and CUE audio memorizing section 330 are restricted by the writing/reading timing with respect to the video and audio memorizing section 310, auxiliary information memorizing section 320, and CUE audio memorizing section 330 and physical capacities of the video and audio memorizing section 310, auxiliary information memorizing section 320, and CUE audio memorizing section 330. However, except the restriction, the storage volumes can be optionally controlled. Therefore, when the storage volumes are arranged to be as large as possible, the respective signals stored through a plurality of intermittent recordings in the respective memorizing sections 310, 320, and 330 can be recorded on the videotape 500 at once. The present invention exerts the described function to thereby perform a consecutive photographing and recording with respect to the videotape 500 at a reduced frequency so that a burden on the apparatus can be reduced leading to an extended life thereof.

Further, when the storage volumes of the video and audio memorizing section 310, auxiliary information memorizing section 320, and CUE audio memorizing section 330 relative to the physical capacities thereof are reduced, the time length required for starting the recording with respect to the videotape 500 can be surely increased. Such an advantage can achieve an effect that a temporal variability involved when the apparatus shifts to the recording-start operation can be absorbed, thereby avoiding as many troubles occurring in the apparatus as possible.

According to the present embodiment, the present invention is implemented in the constitution wherein the information generated by the auxiliary information generating device 200 and the CUE audio are both recorded as the auxiliary information together with the video audio signal. The present invention can be also implemented in the same manner in a constitution wherein one of the information generated by the auxiliary information generating device 200 and the CUE audio is recorded as the auxiliary information.

Figure 2:
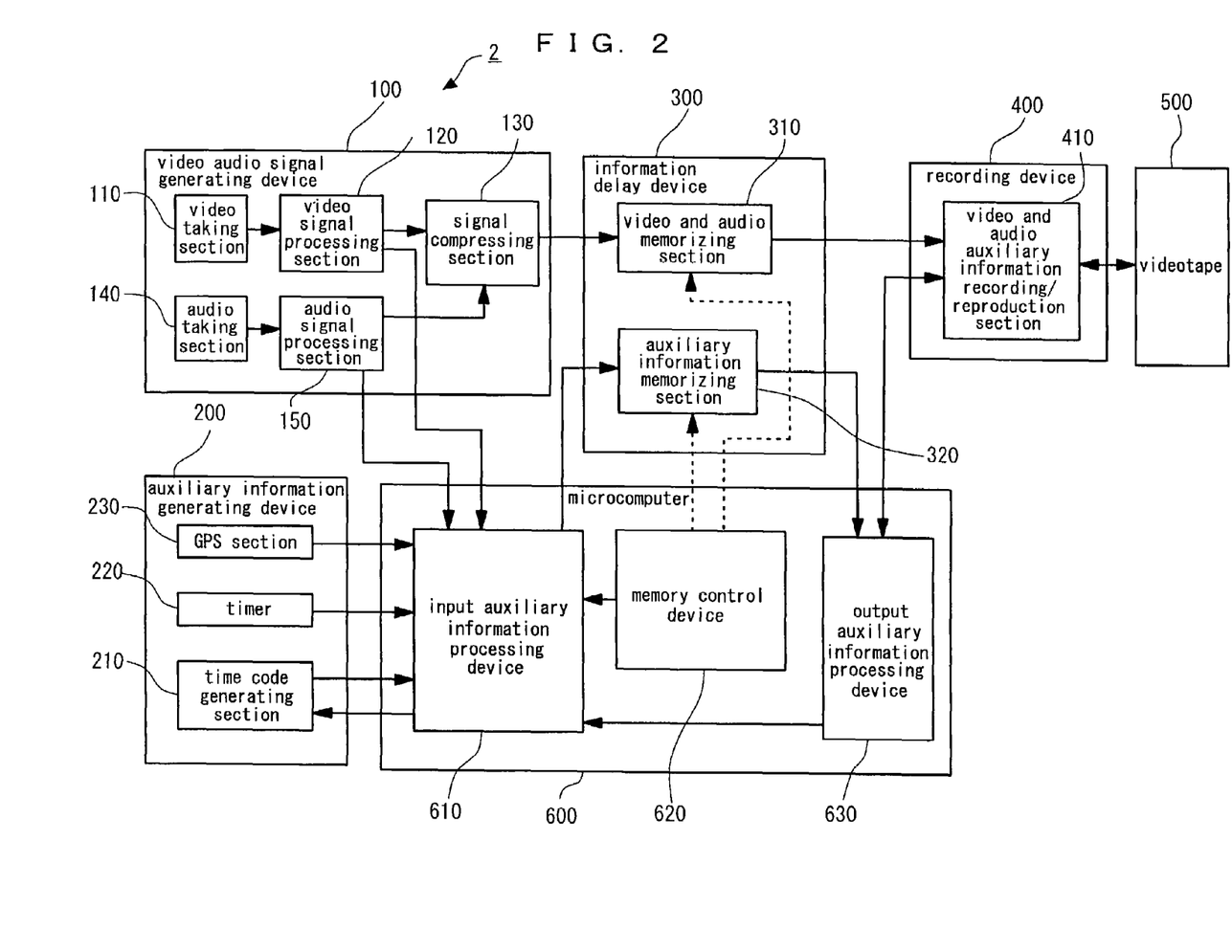
FIG. 2 is a block diagram illustrating a configuration according to a second embodiment of the present invention.

FIG. 2 is a block diagram illustrating a configuration of a magnetic recording/reproduction apparatus 2 according to a second embodiment of the present invention. The magnetic recording/reproduction apparatus 2 is a camera-incorporated videotape recorder. The video signal, such as the digital video signal, generated by the video audio signal generating device 100 and the audio signal, such as the digital audio signal, are inputted to the information delay device 300. In the same manner, the auxiliary information pertaining to the video audio signal, such as the time code and metadata, generated by the auxiliary information generating device 200 is inputted to the information delay device 300. The video signal, audio signal, and auxiliary information are outputted from the information delay device 300 in the delayed state through the control by the memory control device 620. The output of the information delay device 300 is recorded on the videotape 500 by the recording device 400. Below is provided a more detailed description.

When the video audio signal generated by the video audio signal generating device 100 is written in an optional address position in the video and audio memorizing section 310, the auxiliary information pertaining to the video audio signal, such as the time code and metadata, is written in an address position on a time axis corresponding to the vide audio signal in the auxiliary information memorizing section 320. When the stored video audio signal is read from the video and audio memorizing section 310, the auxiliary information of the video audio signal is read from the address position on the time axis corresponding to the video audio signal in the auxiliary information memorizing section 320. The read video audio signal and auxiliary information are recorded on the videotape 500 as the recording medium by the recording device 400.

The recording is performed in the foregoing manner so that the recording with respect to the videotape 500 can be performed eliminating any time difference between the video audio signal and the relevant auxiliary information in the magnetic recording/reproduction apparatus 2 capable of performing the intermittent video photographing in accordance with the designated photographing time length and recording halt intervals and in the magnetic recording/reproduction apparatus 2 capable of starting the recording at the time point when the recording is instructed with respect to the videotape 500 or prior to the time point.

Figure 3:
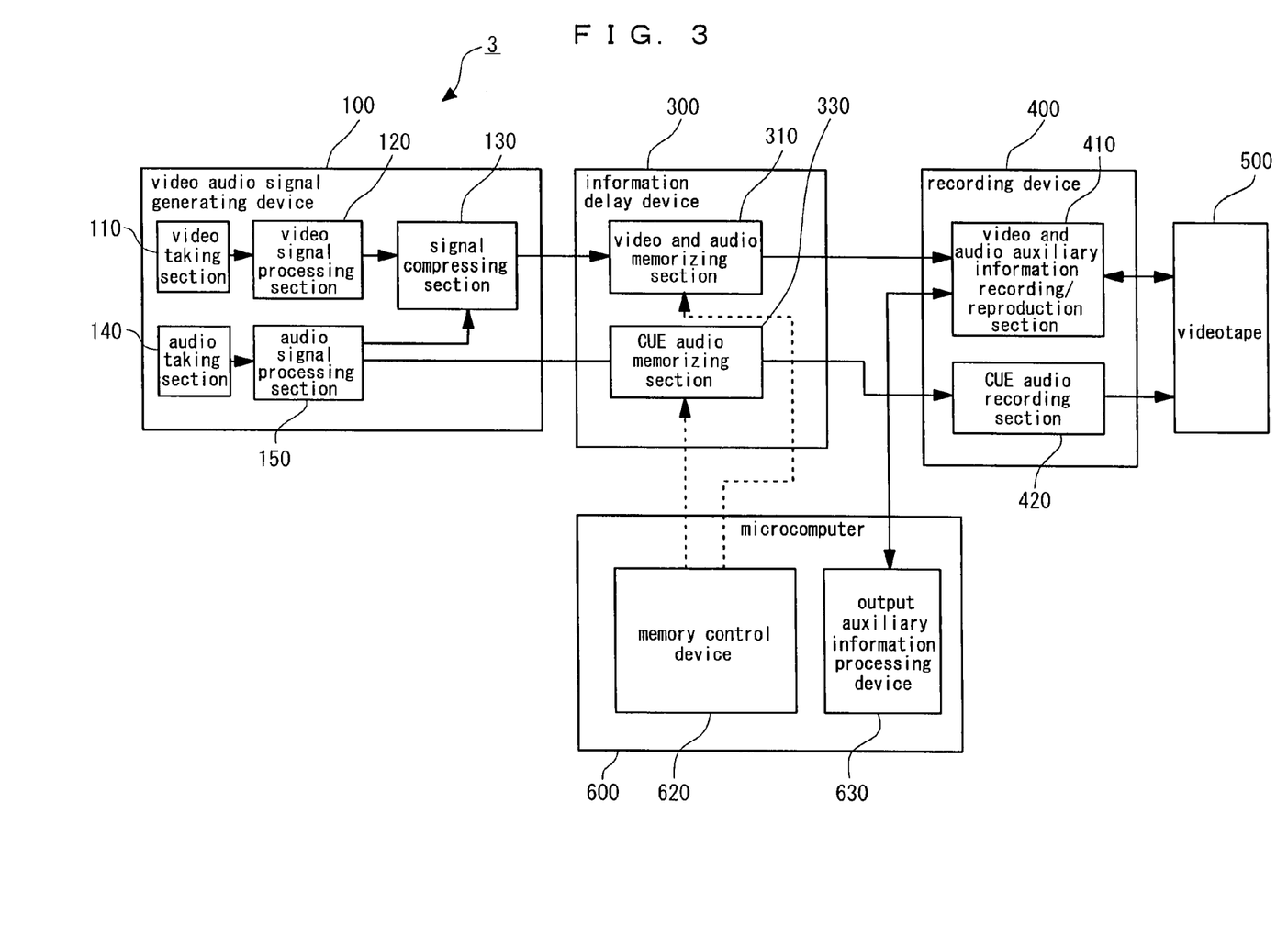
FIG. 3 is a block diagram illustrating a configuration according to a third embodiment of the present invention.

FIG. 3 is a block diagram illustrating a configuration of a magnetic recording/reproduction apparatus 3 according to a third embodiment of the present invention.

The present embodiment is different to the magnetic recording/reproduction apparatus 2 in that the CUE audio is recorded as the auxiliary information, details of which are omitted here. According to such a configuration, the recording with respect to the videotape 500 can be performed eliminating any time difference between the video audio signal and the CUE audio signal in the magnetic recording/reproduction apparatus 3 capable of performing the intermittent video photographing combining the designated photographing time length and recording halt intervals and in the magnetic recording/reproduction apparatus 3 capable of starting the recording at the time point when the recording is instructed with respect to the videotape 500 or prior to the time point.

In the description so far, the videotape 500 is used as the recording medium. The recording medium, however, is not limited thereto and can employ different types of such. It is needless to say that the present invention is also achievable in, for example, a hard disk device, optical disk device, or the like, wherein the video signal can be non-linearly recorded, except for the CUE audio recording. In the foregoing embodiments, the DV method is selected as the compression method, however, MPEG method can be also applicable. In the foregoing embodiments, the camera-incorporated videotape recorder is exemplified, however, a videotape recorder incorporating no camera can be employed.

INDUSTRIAL APPLICABILITY

As thus far described, in the video signal recording apparatus according to the present invention, when the photographed video signal and audio signal are delayed by means of the memory and recorded on the recording medium, the auxiliary information relevant to the video signal and audio signal, such as the time code and metadata, is delayed by means of the memorizing section and recorded on the recording medium. Therefore, the auxiliary information can be recorded on the recording medium with no time delay relative to the video signal and audio signal.

The present invention is thereby capable of maintaining a relevance between the video signal, audio signal and the auxiliary information recorded on the recording medium, wherein it becomes easy to correct colors and specify a photographing site and time in a post processing such as editing, thereby reducing an amount of time required for the post processing and expressing visual effects in a simplified manner.

Further, in the constitution where the CUE audio signal is used as the auxiliary information, the CUE audio signal can be recorded on the recording medium with no time delay relative to the video signal and audio signal. The search operation by means of the CUE audio signal can be thereby performed more accurately in the fast forward/fast rewind reproduction.

The invention claimed is:

1. A video signal recording apparatus comprising:
a video and audio memorizing section for temporarily memorizing an inputted video audio signal;
a time code generating section for generating a time code of said video audio signal;
an auxiliary information memorizing section for temporarily memorizing auxiliary information appended to said video audio signal including said time code;
a recording/reproduction section for recording sequentially a video audio signal read from said video audio memorizing section and auxiliary information read from said auxiliary information memorizing section on a recording medium and reproducing said video audio signal and auxiliary information recorded thereon; and
a controlling section for:
controlling write and read operations of said video audio signal with respect to said video and audio memorizing section,
controlling write and read operations of said auxiliary information with respect to said auxiliary information memorizing section and write and read operations of said auxiliary information with respect to said recording/reproduction section,
storing said video audio signals equivalent to a time length equal to or exceeding an amount of time required from a time point when a recording-start request with respect to the recording medium is made until the recording actually starts with respect to the recording medium to said video and audio memorizing section and thereby delay to record on said recording medium,
storing said auxiliary information appended to said video audio signals for a time period equal to the delay of said video audio signals to said auxiliary information memorizing section and thereby delay to record on said recording medium,
reproducing a time code which is included in an auxiliary information recorded previously and located immediately before a recording starting point where said recording/reproduction section starts to record next on said recording medium to maintain as a recorded time code,
generating a regeneration value obtained from a time code to which one frame time is added to said recorded time code when a recording starts,
replacing sequentially said time codes in said auxiliary information outputted from said auxiliary information memorizing section with time codes in series starting from said regeneration value and thereby recording on said recording medium as a new auxiliary information, and
correcting said regeneration value for an amount of delay corresponding to a storage volume temporarily memorized in said auxiliary information memorizing section and thus obtaining a corrected time code, and thereafter sequential time codes are generated from said corrected time code though said time code generating section.

* * * * *